United States Patent [19]

Stanescu et al.

[11] Patent Number: 4,549,911

[45] Date of Patent: Oct. 29, 1985

[54] PROCESSES FOR HEAT TREATING FERROUS MATERIAL

[75] Inventors: Mircea S. Stanescu, Pluckemin, N.J.; E. Donald Crouch, Jr., Northville, Mich.

[73] Assignee: The BOC Group, Inc., Montvale, N.J.

[21] Appl. No.: 576,589

[22] Filed: Feb. 2, 1984

[51] Int. Cl.$^4$ .................................................. C21D 1/48
[52] U.S. Cl. ........................................ 148/16; 148/15; 148/16.5; 148/16.6
[58] Field of Search ................. 148/16, 15, 16.5, 16.6

[56] References Cited

U.S. PATENT DOCUMENTS

| | | | |
|---|---|---|---|
| 3,337,314 | 8/1967 | Belfit | 585/538 |
| 4,016,011 | 4/1977 | Asai et al. | 148/16 |
| 4,021,272 | 5/1977 | Asai et al. | 148/15 |
| 4,108,693 | 8/1978 | L'Hermite et al. | 148/16.6 |
| 4,415,379 | 11/1983 | Stanescu et al. | 148/16 |
| 4,461,656 | 7/1984 | Ross | 148/16.5 |

*Primary Examiner*—Veronica O'Keefe
*Attorney, Agent, or Firm*—David L. Rae; Larry R. Cassett

[57] ABSTRACT

Rod and wire or other ferrous material is annealed, normalized, spherodized, etc. in a furnace under nitrogen based atmospheres to which is added a mixture of methylacetylene and propadiene. This latter mixture reacts with decarburizing substances such as carbon dioxide in the furnace at relatively low temperatures of about 1000°–1100° F. to substantially preclude decarburization of the ferrous material. The use of a mixture of methylacetylene and propadiene in the amount of approximately 0.1–10% by volume of the furnace atmosphere also results in a relatively high CO level, reduces decarburization and oxidation of the ferrous material.

9 Claims, No Drawings

PROCESSES FOR HEAT TREATING FERROUS MATERIAL

BACKGROUND OF THE INVENTION

The present invention relates to processes for heat treating ferrous material and, more particularly, to methods for annealing, normalizing, spherodizing, etc. rod and wire under nitrogen based atmospheres.

In annealing ferrous material, such as for purposes of stress relief, spherodizing, annealing, etc., it is important to avoid changes in the surface metallurgy of the material. Thus, surface carburization and decarburization are to be avoided during annealing and other similar heat treating processes. It has been found that ferrous material such as rod and wire exhibit a tendency to decarburize during annealing even at relatively low temperatures as a consequence of leakage into the furnace of decarburizing agents such as $CO_2$ from the ambient atmosphere. It has been common practice to utilize protective atmospheres such as endothermic, exothermic, or others in heat treating furnaces. However, as these atmospheres are derived from hydrocarbon sources such as natural gas, the cost of producing these atmospheres has increased significantly in recent years. Furthermore, expensive generator devices are necessary to produce these atmospheres, and these devices require considerable maintenance but yet are relatively inflexible in that they are not effective to produce atmospheres of variable compositions over a wide range of flow rates. Typically, the foregoing conventional generated atmospheres are enriched with natural gas or pure methane so that an adequate level of hydrocarbon is available to react with oxidizing and decarburizing agents leaking into the furnace to thereby avoid decarburizing or oxidation of the ferrous material being annealed or otherwise treated.

In order to avoid carburization or decarburization of ferrous material at a particular temperature in a furnace, it is necessary to maintain an equilibrium condition between carbon dioxide and carbon monoxide, i.e. maintain a predetermined ratio at a given temperature. A discussion of these ratios appears in WIRE TECHNOLOGY, November-December, 1979, pages 51–57 which indicates that by adding a hydrocarbon to a nitrogen based atmosphere, the level of CO increases by virtue of the reactions:

$$CH_4 + CO_2 \rightleftharpoons 2CO + 2H_2 \tag{1}$$

$$2CH_4 + 3O_2 \rightleftharpoons 2CO + 4H_2O \tag{2}$$

$$CH_4 + H_2O \rightleftharpoons CO + 3H_2 \tag{3}$$

Such an increase in CO tends to reduce the ratio of $CO_2/CO$ at a constant temperature to thereby reduce the decarburizing tendency of the furnace atmosphere. Thus, methane addition is effective to control or limit the tendency of a furnace atmosphere to decarburize, but this reaction yields only two molecules of CO for each molecule of methane supplied.

It has been proposed, for example in U.S. Pat. No. 4,415,379, which assigned to the assignee of the present invention, to introduce both propane and methane into a nitrogen based furnace atmosphere in an annealing process. It has been found that this combination of reactants results in the breakdown of propane into a relatively active form of methane which tends to preclude decarburization at lower temperatures. However, the remaining propane will react with $CO_2$, $O_2$ and $H_2O$ in accordance with the following formulas:

$$C_3H_8 + CO_2 \rightleftharpoons 2CO + 2CH_4 \tag{4}$$

$$C_3H_8 + 3.5O_2 \rightleftharpoons 3CO + 4H_2O \tag{5}$$

$$C_3H_8 + 3H_2O \rightleftharpoons 3CO + 7H_2 \tag{6}$$

Thus, propane is also effective by such a reaction to produce two or three molecules of carbon monoxide for each molecule of propane supplied to the furnace.

In European Patent Application, publication No. 027649, published Apr. 29, 1981, it is proposed to utilize methanol as an additive in a nitrogen based annealing process. Although this reference suggests that methanol is effective to avoid carburization and decarburization, it is noted that methanol will react in such atmospheres as follows:

$$CH_3-OH \rightleftharpoons CO + 2H_2 \tag{7}$$

$$H_2 + CO_2 \rightleftharpoons CO + H_2O \tag{8}$$

Thus, although methanol may be effective as an addition to nitrogen based furnace atmospheres during annealing processes, only two molecules of CO are produced from each molecule of methanol supplied to the furnace.

In addition to the foregoing, it has been proposed to utilize materials such as ethane, ethylene, and acetylene in heat treating processes as is described in U.S. Pat. No. 4,108,693. Also, U.S. Pat. No. 4,016,011 describes processes for heat treating ferrous material wherein a liquid organic compound such as methylacetate or isopropyl alcohol is utilized with a nitrogen based atmosphere. It is noted, however, that the reactions resulting as a consequence of utilizing such agents in heat treating processes do not yield levels of carbon monoxide significantly greater than those described above in connection with more conventional additives such as methane, propane, etc.

It is also known to utilize hydrocarbons in the form of propylene ($C_3H_6$) in the course of annealing high carbon steel in nitrogen based atmospheres as is described in HEAT TREATING, March, 1982, pages 32–34. The reactions of propylene with $CO_2$, $O_2$ and $H_2O$ occurs as follows:

$$2C_3H_6 + 3CO_2 \rightleftharpoons 6CO + 3CH_4 \tag{9}$$

$$C_3H_6 + 3O_2 \rightleftharpoons 3CO + 3H_2O \tag{10}$$

$$C_3H_6 + 3H_2O \rightleftharpoons 3CO + 6H_2 \tag{11}$$

In U.S. Pat. No. 4,154,629, the use of an organic liquid as an additive to nitrogen based atmospheres for heat treating ferrous material involves the production of three molecules of CO for each molecule of the organic liquid supplied to the heat treating furnace as is the case from the above reaction of propylene with $CO_2$, $O_2$ and $H_2O$.

Thus, there is a clear need for processes for annealing, normalizing and spherodizing ferrous material wherein decarburization and oxidation of such material is essentially avoided.

OBJECTS OF THE INVENTION

It is an object of the invention to provide improved processes for heat treating ferrous materials.

It is another object of the present invention to provide improved processes for heat treating ferrous materials under nitrogen based atmospheres.

It is still another object of the present invention to anneal ferrous materials without significant decarburization or oxidation thereof.

It is yet another object of the present invention to provide processes for heat treating ferrous material in furnaces under nitrogen based atmospheres wherein carbon monoxide is efficiently generated and maintained in the furnace.

Other objects of the present invention will become apparent from the detailed description of an exemplary embodiment thereof which follows, and the novel features of the invention will be particularly pointed out in conjunction with the claims appended hereto.

SUMMARY

In accordance with the invention, ferrous material such as rod and wire is annealed, normalized, or spherodized, etc. under nitrogen based atmospheres to which is added a mixture of methylacetylene and propadiene. The particular furnace in which such materials are annealed may be either a batch furnace, such as a bell furnace, or may take the form of a conventional continuous furnace having entrance and exit vestibules and a hot zone therebetween. Typically, during annealing, etc., the furnace may be heated to a maximum temperature of approximately 1250°–1650° F.

The mixture of methylacetylene and propadiene is preferably added to the furnace atmosphere together with nitrogen such that the former mixture occupies approximately 0.1–10% by volume. This may be achieved by supplying these constituents through a common conduit or through separate conduits. Mixtures of methylacetylene and propadiene are commercially available as MAPP gas and are effective to react with carbon dioxide, in accordance with the following reactions:

$$C_3H_4 + 2CO_2 \rightleftharpoons 4CO + CH_4 \tag{12}$$

$$C_3H_4 + 2.5O_2 \rightleftharpoons 3CO + 2H_2O \tag{13}$$

$$C_3H_4 + 3CO_2 \rightleftharpoons 6CO + 2H_2 \tag{14}$$

$$C_3H_4 + 3H_2O \rightleftharpoons 3CO + 5H_2 \tag{15}$$

As indicated by these reactions, four molecules of carbon monoxide are produced upon reaction with $CO_2$ per molecule of $C_3H_4$ thereby providing more CO for each volume of reactive gas addition ($C_3H_4$) to the heat treating furnace as compared to the quantity of CO produced from the other reactants such as $CH_4$ and $C_3H_8$ etc. per volume of reactant gas.

In addition, it has been found that MAPP gas reacts effectively with carbon dioxide and other oxidants at relatively low temperatures, i.e. 1000°–1100° F. more effectively than do other known reactive gas agents and thus tends to yield a greater $CO/CO_2$ ratio at a particular temperature which reduces the ability of the particular furnace atmosphere to decarburize at such temperature.

DESCRIPTION OF PREFERRED EMBODIMENTS

In accordance with the invention, ferrous material such as rod and wire may be annealed, normalized, or spheroidized in a conventional furnace under nitrogen based atmospheres. For example, rod and wire may be annealed in a batch furnace such as a bell type furnace or in a continuous furnace having a pre-heat zone, hot zone, and cooling zone intermediate entrance and exit vestibules. As such furnaces are known to those skilled in the art, a detailed description thereof is not considered necessary. Gaseous nitrogen is introduced into appropriate zones of a furnace either to inert vestibules or to establish a nitrogen based atmosphere in the hot zone of the particular furnace. Typically, temperatures of between 1100°–1500° are established in the hot zone of the furnace depending upon the particular heat treatment operation to be performed. The soak time (the period during which the ferrous material is retained in the hot zone under maximum temperatures) and overall cycle time of the particular annealing, normalizing, etc. process are consistent with time periods established for similar, conventional, heat treating processes. It will be understood that in certain furnaces such as bell furnaces, the entire interior of the furnace is heated to a maximum, or soaking temperature, and thus constitutes a "hot zone."

In addition to introducing an inert gas such as nitrogen into the hot zone of a furnace, MAPP gas is also supplied thereto at a flow rate so that such gas is approximately 0.1–10% of the inert gas flow rate to the hot zone. MAPP gas may be supplied to the furnace together with nitrogen or through a separate conduit. As mentioned Previously and is exemplified by Reactions (12)–(15), the use of MAPP gas is particularly efficient in generating CO and is also particularly efficient in the removal of $CO_2$, oxygen and $H_2O$ per volume of MAPP gas introduced into a furnace. In addition, the reaction noted in Reaction (12) commences at a lower temperature and consequently, decarburization is substantially and efficiently minimized. As those skilled in the art will appreciate, MAPP gas is a mixture comprised of stabilized (a) methylacetylene and (b) propadiene, each of which is identified by the chemical formula $C_3H_4$ and has the following bonding structure:

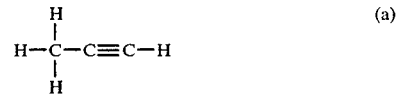

(a)

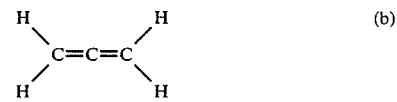

(b)

Also, MAPP gas typically includes propylene, propane, butane and propene. MAPP gas has a typical specific gravity of 1.48 at 60° F. one atmosphere pressure (with air having a specific gravity of 1.00) and MAPP exhibits a specific volume of 8.85 cubic feet per pound at similar temperature and pressure conditions. The liquid phase of MAPP gas boils at a range of to −36° to −4° F. and the toxicity is relatively low. It is known that MAPP gas should not be used in a manner so as to react with copper materials but is suitable for use in heat treatment of ferrous materials in accordance with the invention. For a further description of MAPP gas, reference is made to U.S. Pat. No. 3,337,314. It will be understood that although MAPP gas is a preferred reactive addition agent to nitrogen based atmospheres utilized in heat treating ferrous material, such use of MAPP gas does not exclude the use of other, conventional reactive agents such as methane, propane, etc. as well.

From the foregoing reactions (1)–(15), it is apparent that mixtures of $N_2$-MAPP gas exhibit the following advantages over mixtures of $N_2$-methane; $N_2$-propane and $N_2$-propylene. First, MAPP gas can generate more CO and $H_2$ at the lower temperature employed in stress relieving and spherodized annealing of steel rod, wire and tubing. This is believed to be a consequence of the bonding structure of MAPP gas which is more complex and less stable than other hydrocarbons. Second, mixtures of $N_2$-MAPP gas are more efficient atmospheres with respect to the removal of oxygen, carbon dioxide and water per volume of reactant (MAPP) gas and produce more CO and less unreacted methane. These advantages have been observed in tests performed with $N_2$+propane and $N_2$+MAPP gas in a bell type furnace at the same temperature and stage of an annealing cycle. For the same amount of reactive gas additions, the following furnace atmosphere compositions were recorded:

TABLE I

| Atmosphere Entering Furnace | Temp. °F. | Furnace Atmosphere % Volume | | | |
|---|---|---|---|---|---|
| | | $CO_2$ | CO | $CH_4$ | D.P. |
| $N_2$ + 2.5% $C_3H_8$ | 1100 | 0.16 | 0.28 | 14.0 | −6° F. |
| | 1320 | 0.50 | 1.99 | 8.30 | +16 |
| $N_2$ + 2.5% MAPP | 1100 | 0.61 | 1.60 | 3.6 | +5 |
| | 1320 | 0.43 | 2.69 | 3.3 | −11 |

As mentioned previously, ferrous material such as rod and wire may be effectively annealed at conventional temperatures in standard furnaces in accordance with the invention. By way of example, rod and wire comprised of 1022 and 1018 carbon steel were annealed in a bell type furnace having an internal volume of approximately 930 cubic feet. A flow of nitrogen gas and a flow of MAPP gas were introduced into the furnace at varying times as indicated in Table II below with the corresponding concentrations of $CO_2$, CO, and $CH_4$ being observed with the corresponding dew point also being noted.

TABLE II

| time | Temp | $N_2$ | MAPP | $CO_2$ | CO | $CH_4$ | Dew Pt |
|---|---|---|---|---|---|---|---|
| 6:30 A | 1100 | 1300 | 20 | 0.45 | 1.6 | 2.2 | 0 |
| 7:00 | 1100 | 1300 | 20 | 0.44 | 1.7 | 2.2 | −2 |
| 7:30 | 1100 | 1300 | 15 | 0.46 | 1.8 | 2.2 | +3 |
| 8:30 | 1100 | 1300 | 15 | 0.42 | 1.0 | 2.0 | −1 |
| 9:30 | 1240 | 1300 | 15 | 0.73 | 2.9 | 1.9 | +4 |
| 11:00 | 1320 | 1000 | 8 | 0.62 | 3.6 | 1.3 | −8 |
| 1:00 P | 1320 | 1000 | 0 | 0.46 | 2.8 | 0.5 | −25 |
| 2:30 | 1235 | 1000 | 0 | 0.36 | 2.7 | 0.4 | −31 |

In this particular process, the temperature and dew point are in °F., the values for $N_2$ and MAPP gas are in cfh and the values of CO, $CH_4$ and $CO_2$ are in volume %. The rod and wire were satisfactorily annealed. It will be noted that although the flow rate of inert gas remains relatively constant, the flow rate of MAPP gas decreased from an initial flow rate of 20 cfh to 15 cfh, then to 8 cfh and to zero during the cooling step. Typically, the flow rate of MAPP gas is about one-third of the flow rate of other hydrocarbon materials such as propane employed in prior art heat treating processes. Consequently, by being able to reduce the flow rate of MAPP gas during the operating cycle of an annealing process, a relatively efficient use of this material is attained.

It will be understood that although the foregoing example describes the annealing of 1018 and 1022 carbon steel, other low alloyed grades of steel may be annealed with the use of MAPP gas in accordance with the present invention. In summary, the present invention constitutes a process for heat treating ferrous materials wherein a reactive gaseous agent, i.e. MAPP gas, is efficiently utilized to generate high levels of CO in a furnace hot zone which in turn more effectively protects the ferrous material from decarburization and oxidation, particularly at low furnace temperatures. Consequently, the particular heat treatment process, annealing, normalizing, etc. will become effective at lower temperatures. Thus, by utilizing MAPP gas in accordance with the invention, an efficient removal of $CO_2$ and oxidants is attained per volume of MAPP gas supplied to the furnace while unreacted methane, which tends to lead to undesirable soot formation, is relatively low compared to levels of unreacted methane attained from using reactive gaseous agents such as propane, propylene, etc.

The foregoing and other various changes in form and details may be made without departing from the spirit and scope of the present invention. Consequently, it is intended that the appended claims be interpreted as including all such changes and modifications.

We claim:

1. A method of heat treating ferrous material in a furnace heated to a temperature of at least 1100° F. comprising the steps of introducing a flow of inert gas into the furnace and supplying a mixture comprised of methylacetylene and propadiene into the furnace such that decarburization of the ferrous material is substantially avoided.

2. The method defined in claim 1 wherein the ferrous material is comprised of ferrous rod and wire.

3. The method defined in claim 1 wherein said ferrous material is annealed.

4. The method defined in claim 1 wherein said mixture of methalacetylene and propadiene comprises approximately 0.1 to 10% volume percent of the inert gas introduced into the furnace.

5. The method defined in claim 4 wherein the mixture of methylacetylene and propadiene comprises approximately 0.2 to 1.6 volume percent of the inert gas introduced into the furnace.

6. The method defined in claim 1 wherein the inert gas is nitrogen.

7. A method of subjecting ferrous material to a heat treating cycle in a furnace comprising the steps of heating the furnace to a temperature of at least 1100° F.; introducing a flow of nitrogen gas into the furnace to substantially inert the same; supplying a mixture comprised of methylacetylene and propadiene gas into the furnace for at least part of the cycle to generate in the furnace four volumes of CO per single volume of said mixture upon reaction of the mixture with $CO_2$ which enters the furnace from the external ambient so that decarburization of said ferrous material is substantially avoided; and cooling said ferrous material.

8. The method defined in claim 7 wherein said ferrous material is cooled in said furnace and additionally comprising the step of terminating the flow of said mixture of methylacetylene and propadiene during said cooling step.

9. The method defined in claim 7 wherein said nitrogen gas is introduced into and said mixture is supplied to said furnace by passing said nitrogen gas and said mixture through a common conduit into the furnace.

* * * * *